United States Patent [11] 3,628,746

[72] Inventors Alphonse B. Di Francesco; Elmer E. Boase, both of Rochester, N.Y.
[21] Appl. No. 43,526
[22] Filed June 4, 1970
[45] Patented Dec. 21, 1971
[73] Assignee Eastman Kodak Company Rochester, N.Y.

[54] SELF-CINCHING REEL MECHANISM

16 Claims, 5 Drawing Figs.

[52] U.S. Cl. 242/74, 242/195, 242/210
[51] Int. Cl. B65h 75/28
[50] Field of Search 242/74, 78.3, 78.8, 125, 125.1, 210

[56] References Cited

UNITED STATES PATENTS 3,282,521 11/1966 Schuller 242/210

OTHER REFERENCES

IBM Technical Disclosure Bulletin, Vol. 10, No. 2, July 1967, " Automatic Threading Apparatus," R. G. Miller et al.

*Primary Examiner*—George F. Mautz
*Assistant Examiner*—Edward J. McCarthy
*Attorneys*—Robert W. Hampton and Steve W. Gremban

ABSTRACT: A self-cinching reel mechanism for automatically cinching the leading end of a web onto a rotatable reel hub. A film guide cap is supported for axial movement relative to the hub and cooperates with the periphery of the hub and a reel flange to form a passageway for guiding the web around the hub and into frictional engagement therewith, and further cooperates with the reel flange to retain the web convolutions as they accumulate. After the leading end of the web is cinched onto the hub, the web guide cap is axially moved out of the path of the web by the web convolutions as they accumulate on the hub.

ALPHONSE B. Di FRANCESCO
ELMER E. BOASE
INVENTORS

BY Steve W. Gremban
Robert W Hampton
ATTORNEYS

ALPHONSE B. DiFRANCESCO
ELMER E. BOASE
*INVENTORS*

BY Steve W. Gremban
Robert W Hampton
ATTORNEYS

SELF-CINCHING REEL MECHANISM

BACKGROUND OF THE INVENTION

1. Field of the Invention

This invention relates generally to cinching mechanisms, and more specifically to a self-cinching mechanism for automatically cinching the leading end of a web onto a rotatable hub.

2. Description of the Prior Art

The concept of cinching the leading end of a web onto a rotatable hub is old in the art. Such cinching is normally accomplished by wrapping the leading end of a web around the hub in the direction of rotation of the hub. The small frictional force between the web and the hub is magnified by the angle of wrap such that when web overlap occurs, the overlapping portion of the web places a compressive loading on the inner web convolution. This compressive loading causes an abrupt increase in frictional force which is greatly magnified and exceeds the back tension loading on the web. This abrupt increase in frictional force takes place very rapidly and is referred to as the "cinching" operation.

There are a number of automatic web cinching mechanisms utilized in commercially available equipment. One of such mechanisms involves a takeup cartridge in which thin metal fingers encircle a hub and are in contact with or close proximity to the periphery of the hub to provide web guidance prior to clinching. Such a mechanism is disclosed in U.S. Re. Pat. No. 26,729. Other web cinching mechanisms have pivotally or radially movable flails to catch the leading end of a web and to wrap it around a hub. Such a mechanism is disclosed in British Pat. No. 1,081,050. Automatic threading movie projectors on the market utilize a reel clutch having a plurality of radially extending fingers for engaging one or more sprocket holes in the film and wrapping it around the hub into a cinching position. Although all of these prior art cinching mechanisms achieve the intended purpose, they all depend to a certain degree upon film or web characteristics such as web thickness or width, direction of end curl, or the existence of notches or sprocket holes in the web.

SUMMARY OF THE INVENTION

This invention includes within its scope a self-cinching mechanism for automatically cinching the leading end of a web onto a rotatable hub. The mechanism comprises a rotatable hub, and a web guide means supported for axial movement relative to the hub between a normal cinching position, in which the guide means cooperates with the periphery of the hub to form a passageway for guiding the leading end of a web around the hub and into frictional engagement therewith, and a retracted position, in which the guide means is out of the path of the web and no longer cooperates with the hub. In both of the cinching and retracted positions, the guide means serves to retain the web convolutions on the hub as they accumulate. The self-cinching mechanism is further provided with means responsive to the web convolutions as they accumulate on the hub during the windup operation for axially moving and retaining the web guide means in its retracted position.

One of the objects of the present invention is to provide a self-cinching mechanism for automatically cinching the leading end of a web onto a rotatable hub without depending upon web characteristics such as thickness and width, direction of end curl, and slots or holes in the web to achieve the cinching.

Another object of the invention is to provide a self-cinching mechanism for automatically cinching the leading end of a web onto a rotatable hub, and in which a minimum number of moving parts are involved.

Another object of the invention is to provide a self-cinching mechanism for automatically cinching the leading end of a web onto a rotatable hub, the self-cinching mechanism being of simple design and construction, thoroughly efficient and reliable in operation, and economical to manufacture.

A more specific object of the invention is to provide a self-cinching mechanism for automatically cinching the leading end of a web onto a rotatable hub, the self-cinching mechanism having an axially movable web guiding means movable between a cinching position, in which the web guide means cooperates with the periphery of the hub to form a passageway for guiding the leading end of the web around the hub and into frictional engagement therewith, and a retracted position, in which the web guide means no longer cooperates with the hub and is out of the path of the web.

The invention and its objects and advantages will become more apparent from the detailed description of the preferred embodiment below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
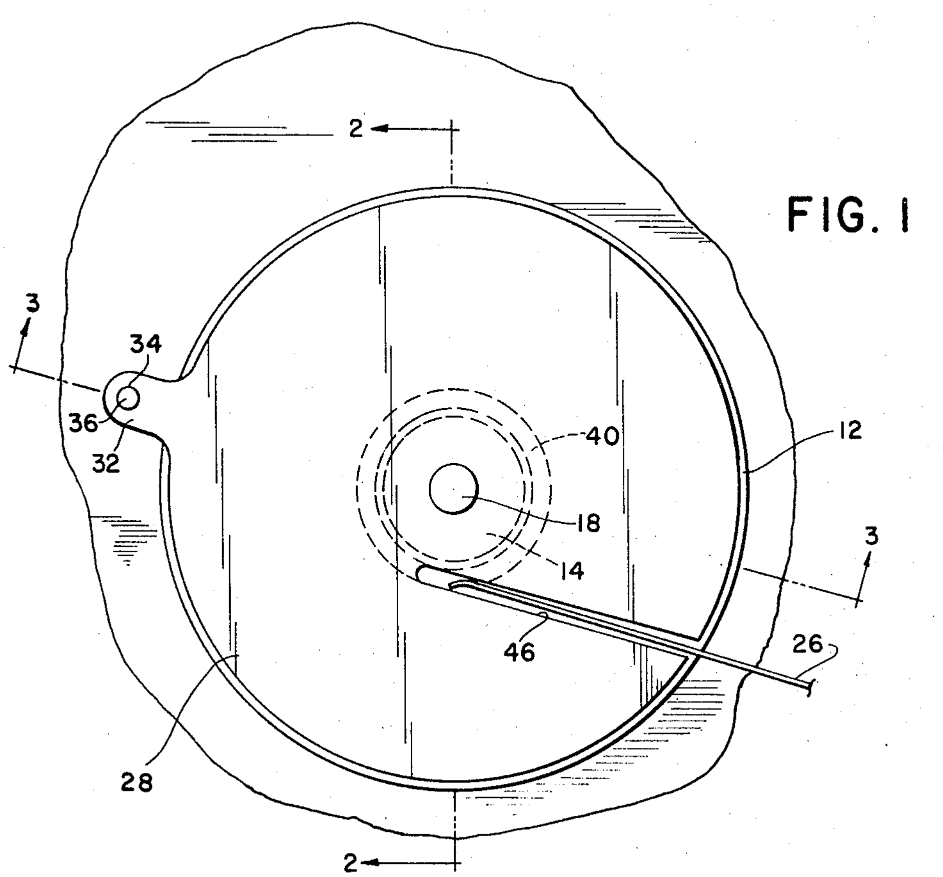
FIG. 1 is a top plan view of a preferred embodiment of the film-cinching mechanism of this invention.
Figure 2:
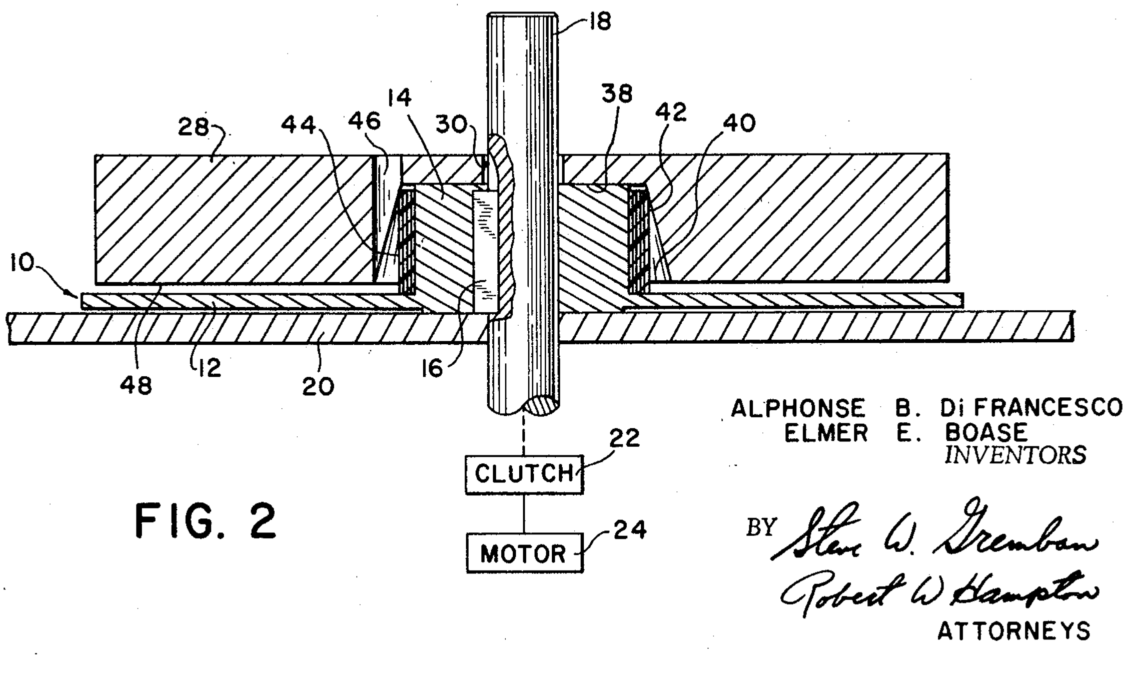
FIG. 2 is a enlarged section view taken along line 2—2 of FIG. 1.
Figure 3:
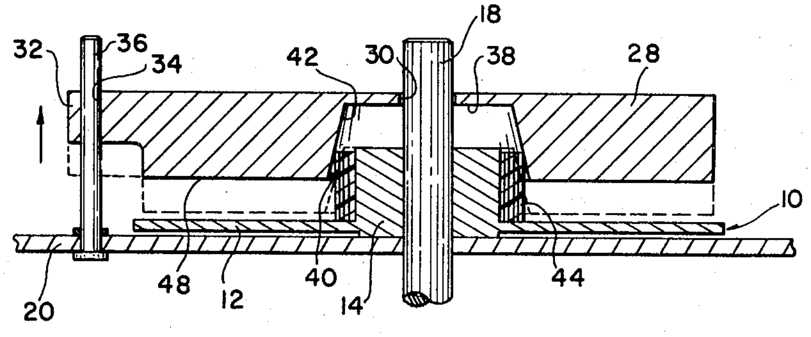
FIG. 3 is a section view similar to FIG. 2 taken along line 3—3 of FIG. 1 in reduced scale showing the cinching position of the web guide cap as it is being moved axially outwardly to its retracted position by the web convolutions as they accumulate on the hub.
Figures 4, 5:
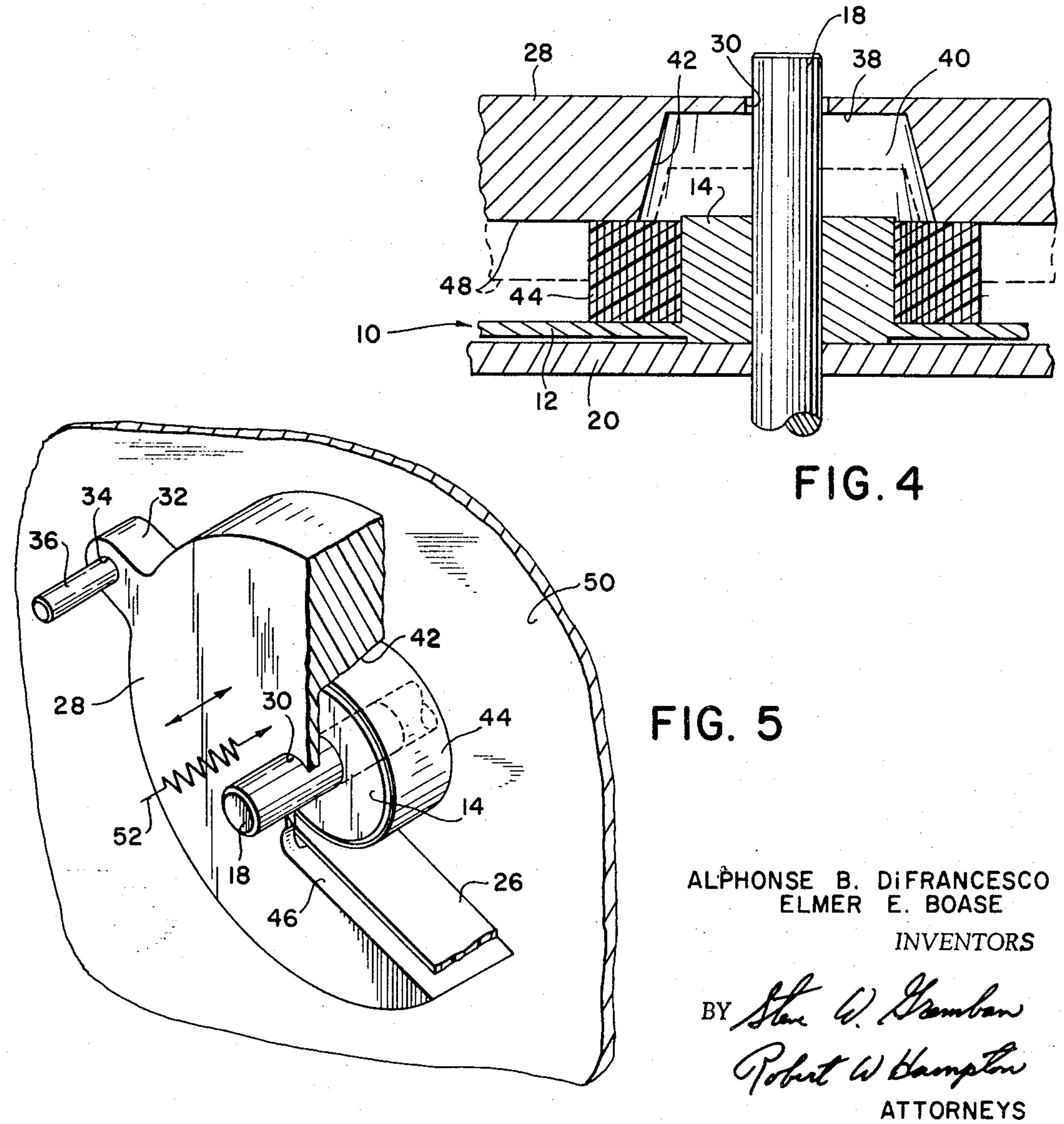
FIG. 4 is an enlarged, segmental section view similar to FIGS. 2 and 3 showing the web guide cap in its fully retracted position acting as a guide flange.
FIG. 5 is a segmental perspective view showing the self-cinching mechanism in a vertical orientation.

With reference to FIGS. 1–4 of the drawings, this invention is shown in relation to a reel 10 having a flange 12 to which a hub 14 is secured by any suitable means, or integrally formed therewith. The reel 10 is releasably secured by a key 16 or the like to a spindle 18 supported for rotation in a fixed, horizontally disposed support plate 20, and rotatably driven as shown in block diagram from preferably through a clutch 22 by any suitable means such as a motor 24. A web guide means for guiding the leading end of a web 26 around hub 14 and into frictional engagement therewith comprises a cap 28 having a bore 30 through which spindle 18 loosely extends. The cap 28 further has a projection 32 as best seen in FIGS. 1 and 3 having an opening 34 through which extends a pivot pin 36 mounted on plate 20. The openings 30, 34 in conjunction with the spindle 18 and pivot pin 36 respectively locate cap 28 in a predetermined angular orientation, and permit axial movement of the cap relative to reel 10 between a cinching position as seen in FIG. 2 and retracted position as seen in FIG. 4. The cap 28 further has a frustoconically shaped cavity 38 for receiving reel hub 14 when the cap is moved into its cinching position. In this cinching position of cap 28, the outer periphery of hub 14, the flange 12, and the surfaces of cavity 38 cooperate to provide an annular passageway 40 for guiding the leading end of a web 26 around hub 14 and into frictional engagement therewith. The side surfaces 42 of the frustoconically shaped cavity 38 are beveled at an angle of approximately 15 degrees in relation to the axis of spindle 18 and cooperate with the outer web convolution 44 as the web builds up on hub 14 as seen in full lines in FIG. 3 for axially moving cap 28 to its retracted position as seen in FIG. 4. In addition, cap 28 has a generally radially outwardly extending slot 46 as best seen in FIGS. 1 and 2 connected to the cavity and through which the leading end of web 26 may be manually inserted into passageway 40.

In the operation of this invention, reel 10 is mounted on spindle 18, and then cap 28 axially mounted on the spindle in overlying relation to the reel. The cap 28 is moved by gravity into its cinching position as best seen in FIG. 2. The spindle 18 and hub 14 are rotatably driven by the drive motor 24 at a rotational speed in excess of the speed at which the leading end of web 26 is introduced into passageway 40. The peripheral surface of hub 14 is provided with a material of relatively high coefficient of friction such as rubber to assure good frictional engagement with the leading end of web 26. The leading end of web 26 is fed through guide slot 46 and into passageway 40 where it is immediately wrapped around hub 14 and cinched thereto by the combined action of the rotating hub 14 and passageway 40. As the web convolutions 44 accumulate on hub 14, an edge of the outer web convolution engages the beveled side surface 42 of cavity 38 and cams or urges cap 28 axially outwardly against the force of gravity due to the wedging action between the edge of web convolution 44 and the beveled surface 42 as the web convolutions accumulate on hub 14. Continued web build up causes the outer web convolution 44 to gradually move cap 28 axially to its fully retracted position as seen in FIG. 4. In this retracted position, the undersurfaces 48 of cap 28 bears against the web convolutions 44 which are constrained between cap 28 and flange 12. After web 26 has been completely wound onto reel 10, removal of the web from the reel is accomplished by applying a force to the web in excess of the frictional load on the web imposed by the cap, and removing any back load on the reel.

Although the invention is shown in connection with a reel 10 having a hub 14 and a flange 12, the invention is clearly applicable to any web takeup mechanism having only a rotatable hub 14. For example, as seen in FIG. 5, the cinching mechanism may comprise a support wall 50 having an opening only large enough to accommodate spindle 18 which extends therethrough. A hub 14 may be mounted on and keyed to spindle 18 in a position adjacent wall 50 for rotation relative to the wall. A cap 28 is supported by spindle 18 and pin 36 for axial movement relative to hub 14 between cinching and retracted positions. Since wall 50 is mounted in a vertical plane with spindle 18 located in a horizontal plane, it is not possible to take advantage of gravity for axially moving the cap 28 to its cinching position as is possible where the spindle is vertically oriented. Accordingly, any suitable resilient means such as a light spring 52 is provided for axially urging cap 28 into its cinching position.

The invention has been described in detail with particular reference to a preferred embodiment thereof, but it will be understood that variations and modifications can be effected within the spirit and scope of the invention.

I claim:

1. In a self-cinching mechanism for automatically cinching the leading end of a web onto a hub rotatable about an axis, the combination comprising:

web guides means supportable for axial movement relative to the hub and cooperating with the periphery of the hub to form a passageway for guiding the leading end of the web around the hub and into frictional engagement therewith, and means for axially moving said web guide means out of the path of the web as it accumulates on the hub.

2. The invention according to claim 1 wherein said moving means for said web guide means comprises a cam follower on said web guide means responsive to the web as it accumulates on the hub.

3. The invention according to claim 1 wherein said moving means for said web guide means comprises a beveled surface on said web guide means engageable by and responsive to the web as it accumulates on the hub.

4. The invention according to claim 1 wherein said moving means comprises a beveled surface on said web guide means, said beveled surface being radially spaced from said axis a distance greater than the radius of the hub, said radial spacing decreasing in the direction of axial movement of said web guide means by the web.

5. The invention according to claim 1 wherein the hub is mountable on a spindle, and said web guide means comprises a plate mountable on said spindle, and said means for moving said web guide means comprises a beveled surface on said plate engageable by and responsive to the web as it accumulates on the hub.

6. The invention according to claim 5 wherein said beveled surface is radially spaced from said axis a distance greater than the radius of the hub, said radial spacing decreasing in the direction of axial movement of said web guide means by the web.

7. The invention according to claim 1 wherein the hub is mounted adjacent a flange lying in a substantially horizontal plane, the hub further being mountable on a vertical spindle extending through said flange, and said web guide means comprises a plate mountable on said spindle in parallel relation to said flange and movable into a cinching position, said plate having a surface defining a cavity for receiving the hub when said plate is in said cinching position, said plate further having a guide slot connected to said cavity and through which the leading end of a web is directed into said cavity, and said moving means for said web guide means comprises a portion of said plate surface radially spaced from and facing the periphery of the hub, said portion being engageable by and responsive to the web as it accumulates on the hub for moving said plate out of the path of the web.

8. The invention according to claim 7 wherein said portion of said plate surface is beveled.

9. The invention according to claim 7 wherein said portion of said plate surface is beveled, and said radial spacing of said portion of said plate surface decreases as the axial distance from said flange increases.

10. In a self-cinching mechanism for automatically cinching a web on a rotatable hub, the combination comprising:

a flange;

a spindle extending transversely of said flange;

a hub mounted on said spindle adjacent said flange;

cinching means overlying said hub and movable between a cinching position, in which said cinching means cooperates with said hub and said flange to form a passageway for guiding a web around said hub and into frictional engagement with the periphery thereof, and a retracted position, in which said cinching means no longer cooperates with said hub, and means for moving said cinching means in a generally axial direction to its retracted position after the leading end of the web is cinched to said hub.

11. The invention according to claim 10 wherein said cinching means comprises cap means overlying said hub, and said moving means for said cap means comprises a cam follower on said cap means responsive to the web as it accumulates on said hub.

12. The invention according to claim 10 wherein said moving means for said cap means comprises a beveled surface on said cap means engageable by and responsive to the web as it accumulates on said hub.

13. The invention according to claim 10 wherein said moving means comprises a beveled surface on said cap means, said beveled surface being radially spaced from said axis a distance greater than the radius of said hub, said radial spacing decreasing in the direction of axial movement of said cap means by the web.

14. The invention according to claim 10 wherein said cap means has a surface defining a cavity for receiving said hub when said cap means is in its cinching position, said cap means further having a guide slot connected to said cavity through which the leading end of a web is directed into said cavity, and said moving means for said cap means comprises a portion of said surface of said cap means which is radially spaced from and facing the periphery of said hub, said portion being engageable by and responsive to the web as it accumulates on said hub for moving said cap means to its retracted position.

15. The invention according to claim 14 wherein said portion of said surface of said cap means is beveled.

16. The invention according to claim 14 wherein said portion of said surface of said cap means is beveled, and said radial spacing of said portion decreases as the axial distance from said reel flange increases.